United States Patent
Karras

(10) Patent No.: US 9,965,821 B2
(45) Date of Patent: May 8, 2018

(54) FULLY PARALLEL IN-PLACE CONSTRUCTION OF 3D ACCELERATION STRUCTURES IN A GRAPHICS PROCESSING UNIT

(71) Applicant: NVIDIA Corporation, Santa Clara, CA (US)

(72) Inventor: Tero Karras, Helsinki (FI)

(73) Assignee: NVIDIA CORPORATION, Santa Clara, CA (US)

( * ) Notice: Subject to any disclaimer, the term of this patent is extended or adjusted under 35 U.S.C. 154(b) by 265 days.

(21) Appl. No.: 13/727,492

(22) Filed: Dec. 26, 2012

(65) Prior Publication Data

US 2013/0235031 A1 Sep. 12, 2013

Related U.S. Application Data

(60) Provisional application No. 61/609,156, filed on Mar. 9, 2012.

(51) Int. Cl.
*G06T 15/00* (2011.01)
*G06T 1/20* (2006.01)
*G06T 17/00* (2006.01)

(52) U.S. Cl.
CPC .............. *G06T 1/20* (2013.01); *G06T 17/005* (2013.01); *G06T 2210/52* (2013.01)

(58) Field of Classification Search
None
See application file for complete search history.

(56) References Cited

U.S. PATENT DOCUMENTS

| | | | |
|---|---|---|---|
| 5,826,262 A * | 10/1998 | Bui et al. | |
| 6,421,664 B1 * | 7/2002 | Groeschel | G06F 17/30327 |
| 6,904,430 B1 * | 6/2005 | Livshits | G06F 17/2211 |
| 7,299,317 B1 * | 11/2007 | Panigrahy et al. | 711/108 |
| 7,475,071 B1 * | 1/2009 | Liu et al. | |

(Continued)

FOREIGN PATENT DOCUMENTS

| | | |
|---|---|---|
| TW | 201135672 | 10/2011 |
| TW | 201203168 | 1/2012 |

OTHER PUBLICATIONS

S A. Cameron and C.K. Yap. "Refinement Methods for Geometric Bounds in Constructive Solid Geometry." ACM Transactions on Graphics, 11(1): 12 (39) pp. 1-29, Jan. 1992.

(Continued)

*Primary Examiner* — Anh-Tuan V Nguyen

(57) ABSTRACT

A system and method for constructing binary radix trees in parallel, which are used for as a building block for constructing secondary trees. A non-transitory computer-readable storage medium having computer-executable instructions for causing a computer system to perform a method is disclosed. The method includes determining a plurality of primitives comprising a total number of primitive nodes that are indexed, wherein the plurality of primitives correspond to leaf nodes of a hierarchical tree. The method includes sorting the plurality of primitives. The method includes building the hierarchical tree in a manner requiring at most a linear amount of temporary storage with respect to the total number of primitive nodes. The method includes building an internal node of the hierarchical tree in parallel with one or more of its ancestor nodes.

20 Claims, 6 Drawing Sheets

(56) References Cited

U.S. PATENT DOCUMENTS

| | | | |
|---|---|---|---|
| 7,512,617 B2* | 3/2009 | Lock et al. | |
| 7,877,258 B1* | 1/2011 | Chelba | G06F 17/2715 704/240 |
| 2003/0204513 A1* | 10/2003 | Bumbulis | G06F 17/30327 |
| 2004/0017385 A1* | 1/2004 | Cosman | G06T 17/05 345/629 |
| 2004/0051728 A1 | 3/2004 | Vienneau et al. | |
| 2004/0249781 A1 | 12/2004 | Anderson | |
| 2005/0144553 A1* | 6/2005 | Bass | G06F 17/30985 715/231 |
| 2006/0139349 A1 | 6/2006 | Reshetov et al. | |
| 2007/0073761 A1* | 3/2007 | Anderson | G06F 17/30312 |
| 2007/0159488 A1 | 7/2007 | Danskin et al. | |
| 2008/0074417 A1 | 3/2008 | Mejdrich et al. | |
| 2009/0077076 A1* | 3/2009 | Berger | G06F 17/30327 |
| 2009/0106530 A1* | 4/2009 | Lauterbach et al. | 712/30 |
| 2009/0167763 A1 | 7/2009 | Waechter et al. | |
| 2009/0287660 A1* | 11/2009 | Shinjo | G06F 17/30327 |
| 2010/0085352 A1 | 4/2010 | Zhou et al. | |
| 2010/0085353 A1* | 4/2010 | Zhou | G06T 17/00 345/419 |
| 2010/0091019 A1* | 4/2010 | Ha | G06T 15/06 345/426 |
| 2011/0219069 A1* | 9/2011 | Varvello et al. | 709/204 |
| 2011/0316854 A1 | 12/2011 | Vandrovec | |
| 2012/0023082 A1* | 1/2012 | Kotha et al. | 707/706 |
| 2012/0173500 A1* | 7/2012 | Chakrabarti et al. | 707/706 |
| 2012/0299914 A1 | 11/2012 | Kilpatrick et al. | |
| 2012/0313944 A1* | 12/2012 | Kontkanen et al. | 345/426 |
| 2012/0320073 A1 | 12/2012 | Mason | |
| 2013/0034309 A1 | 2/2013 | Nystad et al. | |
| 2013/0132398 A1* | 5/2013 | Pfeifle | G06F 17/30241 707/745 |

OTHER PUBLICATIONS

Cohen, Jonathan D., et al. "I-Collide: An Interactive and Exact Collison Detection System for Large-Scale Environments." Proceedings of the 1995 Symposium on Interactive 3D Graphics. ACM, Apr. 1995.

Foley, Tim and Jeremy Sugerman. "KD-Tree Acceleration Structures for a GPU Raytracer." Proceedings of the ACM Siggraph/Eurographics conference on Graphics Hardware. ACM, Jul. 2005.

Gebali, Fayez, "Algorithms for Parallel Computing", Joh Wiley & Sons, Inc., Apr. 19, 2011, pp. 2, 137-139.

Lauterbach, et al., "Fast BVH Construction on GPUs", Mar. 2009, Computer Graphics Forum, vol. 28, No. 2. pp. 375-384.

\* cited by examiner

600

```
1:  for each internal node with index i ∈ [0, n − 2] in parallel
2:      // Determine direction of the range (+1 or −1)
3:      d ← sign(δ(i, i + 1) − δ(i, i − 1))
4:      // Compute upper bound for the length of the range
5:      δ_min ← δ(i, i − d)
6:      l_max ← 2
7:      while δ(i, i + l_max · d) > δ_min do
8:          l_max ← l_max · 2
9:      // Find the other end using binary search
10:     l ← 0
11:     for t ← {l_max/2, l_max/4, ..., 1} do
12:         if δ(i, i + (l + t) · d) > δ_min then
13:             l ← l + t
14:     j ← i + l · d
15:     // Find the split position using binary search
16:     δ_node ← δ(i, j)
17:     s ← 0
18:     for t ← {⌈l/2⌉, ⌈l/4⌉, ..., 1} do
19:         if δ(i, i + (s + t) · d) > δ_node then
20:             s ← s + t
21:     γ ← i + s · d + min(d, 0)
22:     // Output child pointers
23:     if min(i, j) = γ then left ← L_γ else left ← I_γ
24:     if max(i, j) = γ + 1 then right ← L_{γ+1} else right ← I_{γ+1}
25:     I_i ← (left, right)
26: end for
```

FIG. 6

FULLY PARALLEL IN-PLACE CONSTRUCTION OF 3D ACCELERATION STRUCTURES IN A GRAPHICS PROCESSING UNIT

CROSS REFERENCE TO RELATED APPLICATIONS

This application is a conversion of and claims priority to and the benefit of Provisional Patent Application No. 61/609,156, entitled "FULLY PARALLEL IN-PLACE CONSTRUCTION OF 3D ACCELERATION STRUCTURES ON A GPU," having a filing Date of Mar. 9, 2012, which is herein incorporated by reference in its entirety.

BACKGROUND

In recent years, general-purpose GPU computing has given rise to a number of methods for constructing bounding volume hierarchies (BVHs), octrees, and k-d trees for millions of primitives in real-time. Some methods aim to maximize the quality of the resulting tree using the surface area heuristic, while others choose to trade tree quality for increased construction speed.

The right quality vs. speed tradeoff depends heavily on the application. Tree quality is usually preferable in ray tracing where the same acceleration structure is often reused for millions of rays. Broad-phase collision detection and particle interaction in real-time physics represent the other extreme, where construction speed is of primary importance—the acceleration structure has to be reconstructed on every time step, and the number of queries is usually fairly small. Furthermore, certain applications, such as voxel-based global illumination and surface reconstruction, specifically rely on regular octrees and k-d trees, where tree quality is fixed.

The main shortcoming with existing methods that aim to maximize construction speed is that they generate the node hierarchy in a sequential fashion, usually one level at a time, since each round of processing has to complete before the next one can begin. This limits the amount of parallelism that they can achieve at the top levels of the tree, and can lead to serious underutilization of the parallel cores. The sequential processing is already a bottleneck with small workloads on current GPUs, which require tens of thousands of independent parallel threads to fully utilize their computing power. The problem can be expected to become even more significant in the future as the number of parallel cores keeps increasing. Another implication of sequential processing is that the existing methods output the hierarchy in a breadth-first order, even though a depth-first order would usually be preferable considering data locality and cache hit rates.

SUMMARY

A computer implemented method and system for maximizing parallelism in the construction of hierarchical trees, such as, bounding volume hierarchies (BVHs), octrees, and k-d trees. Embodiments of the present invention provides for a fast method for constructing BVHs, octrees, and k-d trees so that the overall performance scales linearly with the number of available cores and the resulting data structure is always in a strict depth-first order. The novel method includes constructing binary radix trees in a fully data-parallel fashion. The binary radix tree is then used as a building block for efficiently constructing other types of trees.

In one embodiment, a non-transitory computer-readable storage medium having computer-executable instructions for causing a computer system to perform a method is disclosed. The method includes determining a plurality of primitives comprising a total number of primitive nodes that are indexed, wherein the plurality of primitives correspond to leaf nodes of a hierarchical tree. The method includes sorting the plurality of primitives. The method includes building the hierarchical tree in a manner requiring at most a linear amount of temporary storage with respect to the total number of primitive nodes. The method also includes building an internal node of the hierarchical tree in parallel with one or more of its ancestor nodes. That is, one or more internal nodes of the hierarchical tree are built in parallel with one or more of their respective ancestor nodes.

In another embodiment, a computer system is disclosed comprising a processor, and a memory coupled to the processor and having stored therein instructions that, if executed by the computer system cause the computer system to execute a method. The method includes determining a plurality of primitives comprising a total number of primitive nodes that are indexed, wherein the plurality of primitives correspond to leaf nodes of a hierarchical tree. The method includes sorting the plurality of primitives. The method includes building the hierarchical tree in a manner requiring at most a linear amount of temporary storage with respect to the total number of primitive nodes. The method also includes building an internal node of the hierarchical tree in parallel with one or more of its ancestor nodes. That is, one or more internal nodes of the hierarchical tree are built in parallel with one or more of their respective ancestor nodes.

In still another embodiment, a system is disclosed comprising means for assigning a Morton code to a plurality of primitives comprising a total number of primitive nodes that are indexed, wherein the plurality of primitives correspond to leaf nodes of a hierarchical tree. The system includes means for sorting the plurality of primitives. The system includes means for building the hierarchical tree in a manner requiring at most a linear amount of temporary storage with respect to the total number of primitive nodes. The system also includes means for building an internal node of the hierarchical tree in parallel with one or more of its ancestor nodes. That is, one or more internal nodes of the hierarchical tree are built in parallel with one or more of their respective ancestor nodes.

These and other objects and advantages of the various embodiments of the present disclosure will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

FIG. 6 is an illustration of pseudocode for constructing a binary radix tree, in accordance with one embodiment of the present disclosure.

DETAILED DESCRIPTION

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "sorting," "determining," "building," "assigning," or the like, refer to actions and processes (e.g., flowcharts 200 and 500 of FIGS. 2 and 5, respectively) of a computer system or similar electronic computing device or processor (e.g., system 100 of FIG. 1). The computer system or similar electronic computing device manipulates and transforms data represented as physical (electronic) quantities within the computer system memories, registers or other such information storage, transmission or display devices.

Figure 2:
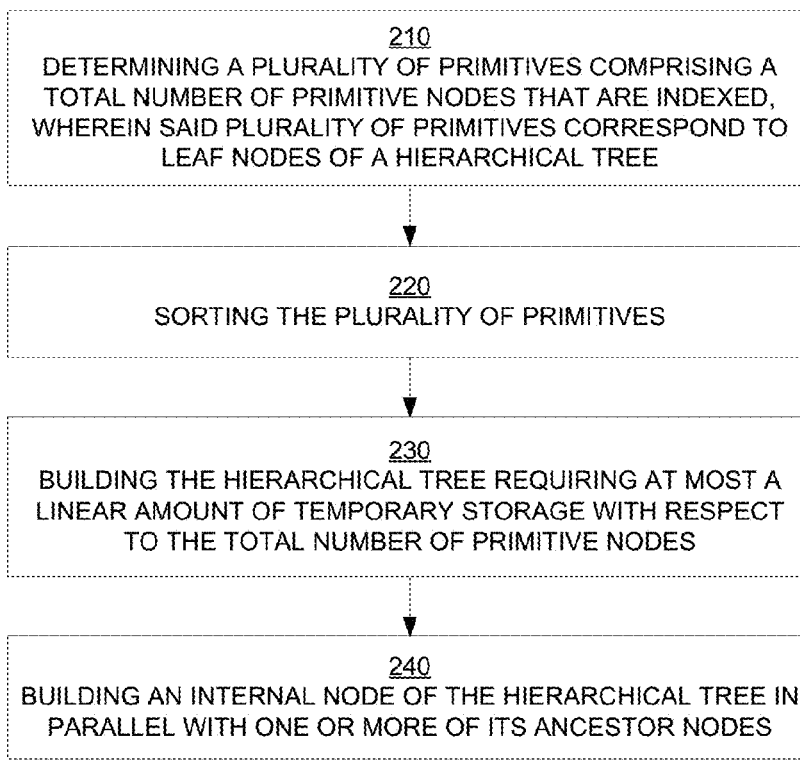
FIG. 2 is a flow diagram illustrating a computer implemented method for constructing hierarchical trees in parallel, in accordance with one embodiment of the present disclosure.

FIG. 2 is a flowchart of examples of computer-implemented methods for processing data according to embodiments of the present invention. Although specific steps are disclosed in the flowcharts, such steps are exemplary. That is, embodiments of the present invention are well-suited to performing various other steps or variations of the steps recited in the flowcharts.

Embodiments of the present invention described herein are discussed within the context of hardware-based components configured for monitoring and executing instructions. That is, embodiments of the present invention are implemented within hardware devices of a micro-architecture, and are configured for monitoring for critical stall conditions and performing appropriate clock-gating for purposes of power management.

Other embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

Figure 1:
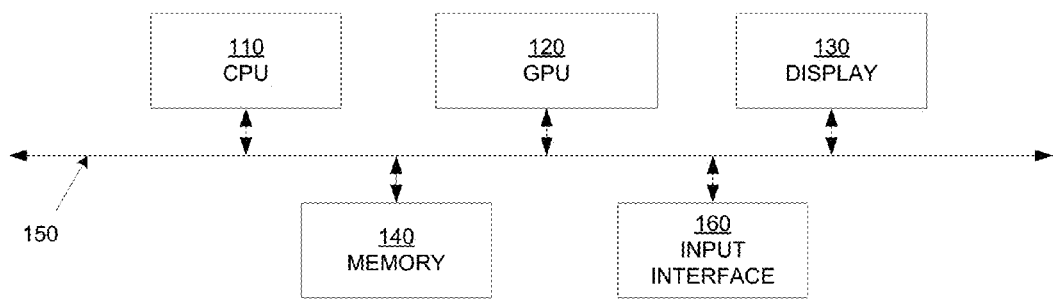
FIG. 1 depicts a block diagram of an exemplary computer system suitable for implementing the present methods, in accordance with one embodiment of the present disclosure.

FIG. 1 is a block diagram of an example of a computing system 100 capable of implementing embodiments of the present disclosure. Computing system 100 broadly represents any single or multi-processor computing device or system capable of executing computer-readable instructions. Examples of computing system 100 include, without limitation, workstations, laptops, client-side terminals, servers, distributed computing systems, handheld devices, or any other computing system or device. In its most basic configuration, computing system 100 may include at least one processor 110 and a system memory 140.

Both the central processing unit (CPU) 110 and the graphics processing unit (GPU) 120 are coupled to memory 140. System memory 140 generally represents any type or form of volatile or non-volatile storage device or medium capable of storing data and/or other computer-readable instructions. Examples of system memory 140 include, without limitation, RAM, ROM, flash memory, or any other suitable memory device. In the example of FIG. 1, memory 140 is a shared memory, whereby the memory stores instructions and data for both the CPU 110 and the GPU 120. Alternatively, there may be separate memories dedicated to the CPU 110 and the GPU 120, respectively. The memory can include a frame buffer for storing pixel data drives a display screen 130.

The system 100 includes a user interface 160 that, in one implementation, includes an on-screen cursor control device. The user interface may include a keyboard, a mouse, and/or a touch screen device (a touchpad).

CPU 110 and/or GPU 120 generally represent any type or form of processing unit capable of processing data or interpreting and executing instructions. In certain embodiments, processors 110 and/or 120 may receive instructions from a software application or hardware module. These instructions may cause processors 110 and/or 120 to perform the functions of one or more of the example embodiments described and/or illustrated herein. For example, processors 110 and/or 120 may perform and/or be a means for performing, either alone or in combination with other elements, one or more of the monitoring, determining, gating, and detecting, or the like described herein. Processors 110 and/or 120 may also perform and/or be a means for performing any other steps, methods, or processes described and/or illustrated herein.

In some embodiments, the computer-readable medium containing a computer program may be loaded into computing system 100. All or a portion of the computer program stored on the computer-readable medium may then be stored in system memory 140 and/or various portions of storage devices. When executed by processors 110 and/or 120, a computer program loaded into computing system 100 may cause processor 110 and/or 120 to perform and/or be a means for performing the functions of the example embodiments described and/or illustrated herein. Additionally or alternatively, the example embodiments described and/or illustrated herein may be implemented in firmware and/or hardware. Also shown in FIG. 1 is display 130 and input interface 160.

FIG. 2 is a flow diagram 200 illustrating a computer implemented method for constructing hierarchical trees in parallel, in accordance with one embodiment of the present disclosure. In another embodiment, flow diagram 200 is implemented within a computer system including a processor and memory coupled to the processor and having stored therein instructions that, if executed by the computer system causes the system to execute a method for constructing hierarchical trees in parallel. In still another embodiment, instructions for performing a method are stored on a non-transitory computer-readable storage medium having computer-executable instructions for causing a computer system to perform a method for constructing hierarchical trees in parallel. The method outlined in flow diagram 200 is implementable by one or more components of the computer system 100 of FIG. 1.

In practice, hierarchical trees are used for instance in graphics to accelerate path tracking, real-time ray tracing, collision detection, photon mapping, voxel-based scene representations, etc. In embodiments, trees are constructed quickly in a parallel fashion. That is, in embodiments of the present invention, it is possible because all levels of the hierarchical tree are processed in parallel from the start. This avoids underutilization, and makes the performance scale linearly with the size of the GPU.

For clarity, the method of FIG. 2 is described within the context of building bounding volume hierarchies or BVHs, but is well suited to building point-based octrees, and k-d trees.

At 210, the method includes determining a plurality of primitives. The plurality is associated and comprises a total number of primitives nodes that are indexed. The plurality of primitives correspond to leaf nodes of a hierarchical tree that is being generated.

In one embodiment, each of the plurality of primitives is assigned a Morton code. Within the context of BVHs, for example, a Morton code is generated for each primitive by finding the centroid point of its bounding box, and looking at its bit representation relative to the scene bounding box. The idea is to expand the bits of each coordinate, and then interleave them to form a single bit string.

To continue the example using BVHs, the Morton code for a given point contained within a three-dimensional (3D) unit cube is defined by the bit string $X0Y0Z0X1Y1Z1$, where the x coordinate of the point is represented as $0:X0X1X2$, etc., and similarly for y and z coordinates. The Morton code of an arbitrary 3D primitive can be defined in terms of the centroid of its axis-aligned bounding box (AABB). In practice, the Morton codes can be limited to 30 or 63 bits in order to store them as 32-bit or 64-bit integers, respectively, in embodiments.

At 220, the method includes sorting the plurality of primitives according to their Morton codes. For instance, in the case of BVHs, this orders them along a space-filling curve, so that primitives close to each other in 3D are likely to end up nearby in the sorted sequence.

At 230, the method includes building the hierarchical tree requiring at most a linear amount of temporary storage with respect to the total number of primitive nodes. That is, the hierarchical tree is built in a manner that requires only a linear amount of memory with respect to the number of input primitives in embodiments of the present invention. Additionally, in one embodiment the hierarchical tree is built or constructed in parallel.

At 240, the method includes building an internal node of the hierarchical tree in parallel with one or more of its ancestor nodes. That is, one or more internal nodes of the hierarchical tree are built in parallel with one or more of their respective ancestor nodes. As such, in embodiments of the present invention at least one node is constructed in parallel with at least one of its ancestor nodes.

In embodiments of the present invention, the construction of the hierarchical tree is performed by constructing a binary radix tree, that is defined over the set of Morton codes. For instance, in the case of BVHs, a node hierarchy is generated wherein each subtree corresponds to a linear range of sorted primitives. In the prior art, a binary tree is commonly used for indexing string data. In one embodiment, the input is the set of primitives, or plurality of primitives that define the leaf nodes. In the present embodiment, the input is the sorted Morton codes. Further, the binary radix tree comprises the primitive nodes and one or more internal nodes. Each internal node corresponds to the longest common prefix shared by primitives of corresponding primitive nodes in a respective subtree.

Figure 3:
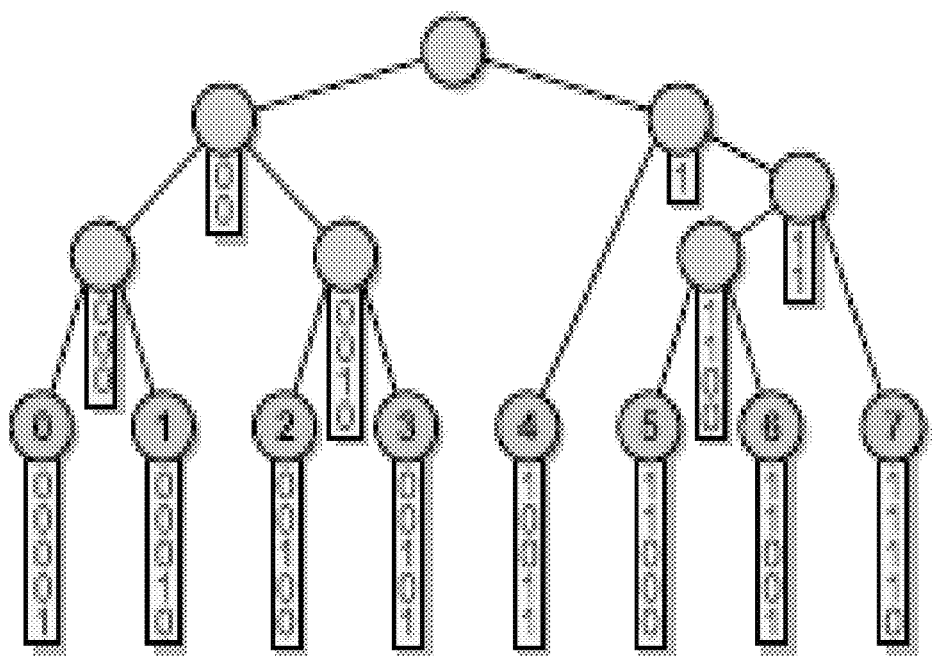
FIG. 3 is a diagram of an ordered binary radix tree used during the construction of the radix tree, in accordance with one embodiment of the present disclosure.

FIG. 3 is a diagram of a binary radix tree 300, in accordance with one embodiment of the present disclosure. In particular, radix tree 300 is an ordered binary radix tree including eight leaf nodes, with index numbering "0-7." The leaf nodes store a set of 5-bit keys in lexicographical order.

The leaf nodes or primitives are shown as including 5-bits for illustration purposes, but can be of any length, as previously described. The internal nodes represent their common prefixes. Further, each internal node covers a linear range of keys, which is partitioned into two subranges according to their first differing bit, as will be described below in relation to FIG. 4.

In particular, given a set of n keys $k_0, \ldots, k_{n-1}$ represented as bit strings, a binary radix tree (also called a Patricia tree) is a hierarchical representation of their common prefixes. The keys are represented by the leaf nodes, and each internal node corresponds to the longest common prefix shared by the keys in its respective subtree, as is shown in FIG. 3.

In contrast to a prefix tree, which contains one internal node for every common prefix, a radix tree is compact in the sense that it omits nodes with only one child. Therefore, every binary radix tree with n leaf nodes contains exactly n−1 internal nodes, as is shown in FIG. 3. In one embodiment, a child node is a leaf node. Duplicate keys require special attention, in one embodiment.

More particularly, in one embodiment, ordered trees are only considered, where the children of each node, and consequently the leaf nodes, are in lexicographical order. This is equivalent to requiring that the sequence of keys be sorted, which enables representing the keys covered by each node as a linear range [i,j]. Using $\delta(i, j)$ to denote the length of the longest common prefix between keys $k_i$ and $k_j$, the ordering implies that $\delta(i',j') \geq \delta(i,j)$ for any i', j'∈[i,j]. The prefix corresponding to a given node is determined by comparing its first and last key, wherein the other keys are guaranteed to share the same prefix.

In effect, each internal node partitions its keys according to their first differing bit, i.e., the one following $\delta(i,j)$. This bit will be zero for a certain number of keys starting from $k_i$ and one for the remaining ones until $k_j$. The index of the last key where the bit is zero is labeled as a "split position", denoted by $\gamma \in [i,j-1]$. Since the bit is zero for $k_\gamma$ and one for $k_{\gamma+1}$, the split position must satisfy $\delta(\gamma; \gamma+1) = \delta(i,j)$. The resulting subranges are given by [i, γ] and [γ+1, j], and are further partitioned by the left and right child node, respectively.

As shown in FIG. 3, the root corresponds to the full range of keys, [0;7]. Since $k_3$ and $k_4$ differ at their first bit, the range is split at γ=3, resulting in subranges [0,3] and [4,7]. The left child further splits [0,3] at γ=1 based on the third bit, and the right child splits [4,7] at γ=4 based on the second bit.

Figure 4:
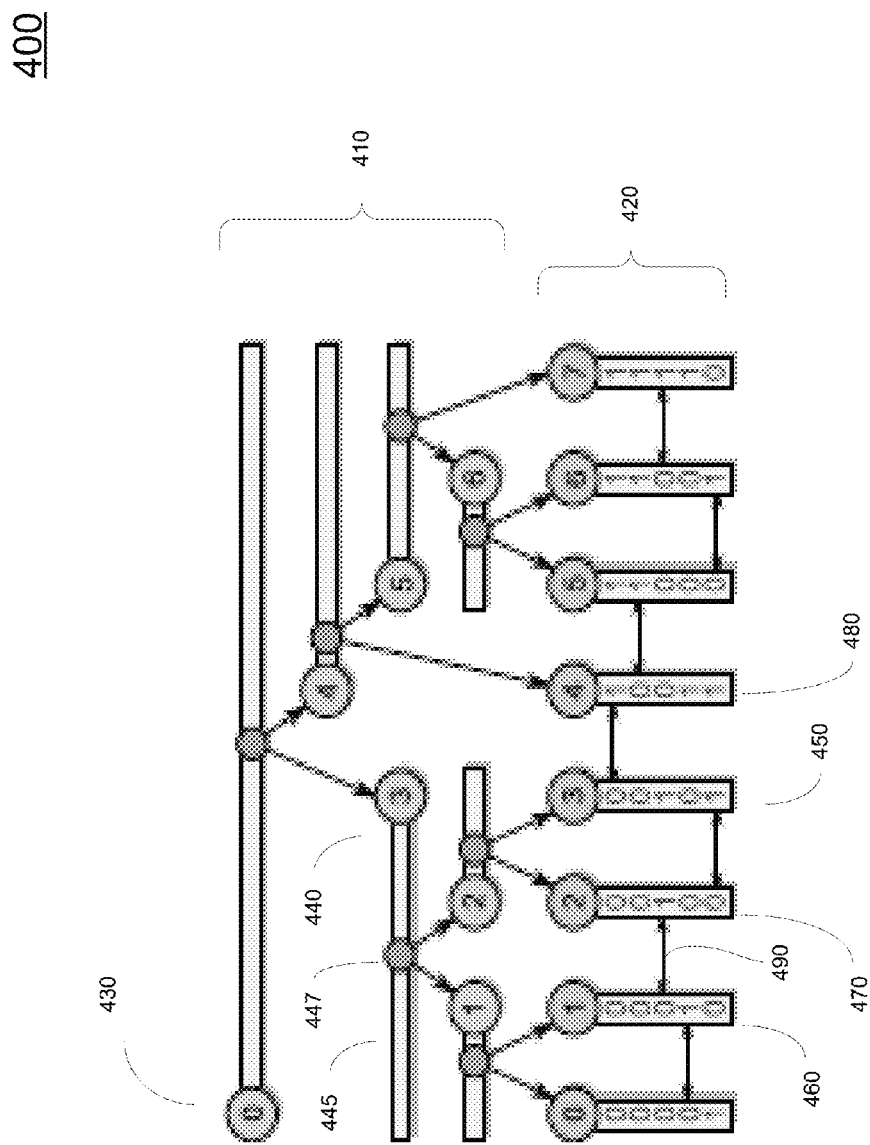
FIG. 4 is a diagram of a node hierarchy layout for a binary radix tree, first introduced in FIG. 3, in accordance with one embodiment of the present disclosure.
Figure 5:
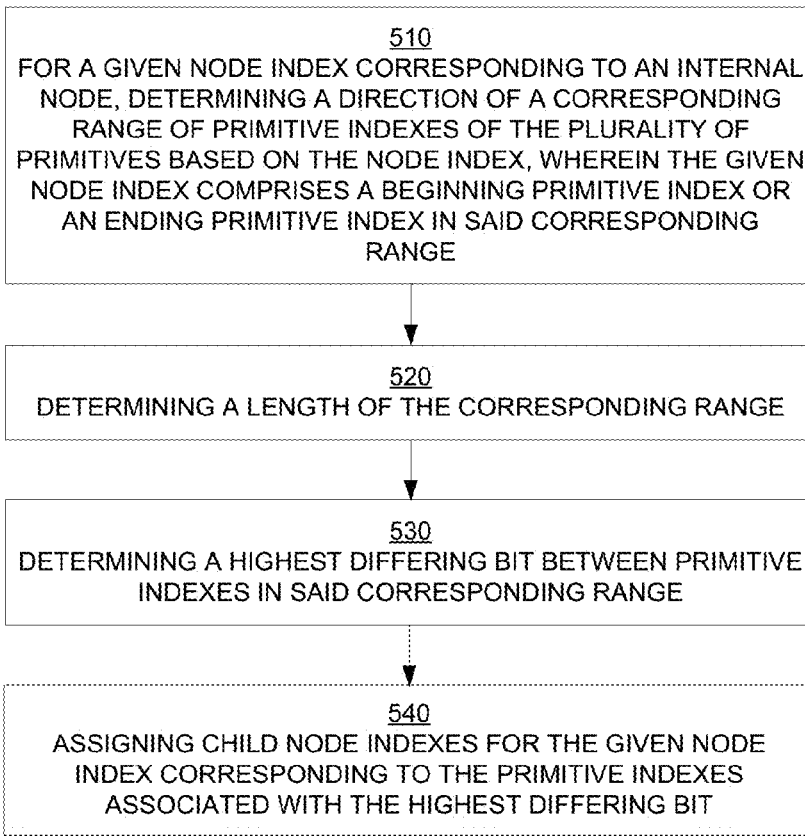
FIG. 5 is a flow diagram illustrating a method for constructing binary radix trees in parallel, in accordance with one embodiment of the present disclosure.

FIGS. 4 and 5 are diagrams illustrating the construction of binary radix trees that are subsequently used to construct secondary trees, such as, BVHs, octrees, k-d trees, etc. Specifically, FIG. 4 is a diagram of a node hierarchy layout for a binary radix tree, first introduced in FIG. 3, and FIG. 5 is a flow diagram illustrating a method for constructing binary radix trees in parallel, in accordance with embodiments of the present disclosure.

FIG. 4 is a diagram of an ordered binary radix tree 400, first introduced in FIG. 3, wherein the leaf nodes are numbered "0-7" and are associated with a set of 5-bit keys (e.g., Morton codes) sorted in lexicographical order, in accordance with one embodiment of the present disclosure. For instance, leaf node "1" is associated with a 5-bit Morton code "0-0-0-1-0" and leaf node "2" is associated with a 5-bit Morton code "0-0-1-0-0."

As shown in FIG. 4, to enable parallel construction of the binary radix tree 400, a connection is established between internal node indices 410 and the primitive indices (of the leaf nodes) 420 through the layout shown in FIG. 4. That is, indices of the internal nodes are assigned in a way to enable finding their children without depending on earlier results. In particular, as shown in FIG. 4, each internal node has been assigned an index between "0-6", and is aligned horizontally with a leaf node of the same index. For instance, internal node index 3 440 is horizontally aligned with leaf node or primitive index 3 450.

Also, the range of keys (e.g., leaf nodes) covered by each internal node is indicated by a horizontal bar, and the split position, corresponding to the first bit that differs between the keys is indicted by a circle. For instance, for internal node index "3" 440 is associated with range 445 (shown by the horizontal bar) that includes leaf nodes "0-3". The split position is shown by circle 447, and indicates that the highest differing bit is between leaf node indices "1" 460 and "2" 470.

The leaf nodes and the internal nodes are stored in two separate arrays, L and I, respectively, for clarity and purposes of illustration. The node layout in FIG. 4 is defined so that the root node 430 is located at $I_0$, and the indices of its children, as well as the children of any internal node, are assigned according to its respective split position, as will be described more fully in relation to FIG. 5. For instance, the left child is located at $I_\gamma$ if it covers more than one key, or at $L_\gamma$ if it is a leaf. Similarly, the right child is located at $I_{\gamma+1}$ or $L_{\gamma+1}$, as is shown in FIG. 4.

An important property of the node layout shown in FIG. 4 is that the range of primitive indices belonging to each internal node includes and coincides with either its first primitive or leaf node, or its last primitive or leaf node. Also, the root node "0" 430 is located at the beginning of its range [0; n−1], such that the left child of any internal node is located at the end of its range [i,γ], and the right child is located at the beginning of its range [γ+1;j].

FIG. 5 is a flow diagram 500 illustrating a computer implemented method for constructing binary radix trees in parallel, in accordance with one embodiment of the present disclosure. In another embodiment, flow diagram 500 is implemented within a computer system including a processor and memory coupled to the processor and having stored therein instructions that, if executed by the computer system causes the system to execute a method for constructing hierarchical trees in parallel. In still another embodiment, instructions for performing a method are stored on a non-transitory computer-readable storage medium having computer-executable instructions for causing a computer system to perform a method for constructing hierarchical trees in parallel. The method outlined in flow diagram 500 is implementable by one or more components of the computer system 100 of FIG. 1.

The method outlined in FIG. 5 expands on the process outlined in 230 of FIG. 2 to build the hierarchical tree, in one embodiment. Specifically, the node hierarchy is generated by partitioning the primitives, or leaf nodes. In one embodiment, the partitioning is performed by constructing a radix tree, defined over the set of Morton codes representing the leaf nodes. More particularly, parallel construction of the node hierarchy is performed by establishing a connection between the internal node indices and the primitive indices of the leaf nodes through the tree layout shown in FIGS. 3 and 4. That is, indices for the internal nodes are assigned in a way that enables finding their children nodes without depending on earlier results. In that manner, no synchronization is performed between layers of the node hierarchy. Also, in that manner, one or more internal nodes of the hierarchical tree are built in parallel with one or more of their respective ancestor nodes.

In particular, in order to construct a binary radix tree, the process outlined in FIG. 5 determines the range of keys covered by each internal node, and determines children (two since this is a binary radix tree) of each internal node. Since, the range of primitive indices belonging to each internal node includes and coincides with either its first primitive or leaf node, or its last primitive or leaf node, as described above, one end of the range is determined. The other end of the range is determined by looking at neighboring primitive indices. Thereafter, the children can then be identified by finding the split position, by virtue of the node layout, as illustrated in FIG. 4 for example, and as further described below.

In one embodiment, the process outlined in FIG. 5 is performed using pseudocode 600 illustrated in FIG. 6, wherein pseudocode 600 constructs a binary radix tree. For simplicity, in pseudocode 600, $\delta(i,j)=-1$ when $j \notin [0,n-1]$. More particularly, each internal node $I_i$ is processed in parallel, in one embodiment.

At 510, for a given node index corresponding to an internal node, the method of FIG. 5 includes determining a direction of a corresponding range of primitive indices of the plurality of primitives based on the node index. Within the radix tree, each internal node belongs to a range of primitive indices. More particularly, a relationship exists between an internal node of an assigned index, and a primitive index with the same index number. Specifically, the primitive index with the same index number is included in the corresponding range of primitive indices. Further, the given node index comprises a beginning primitive index or an ending primitive index in the corresponding range.

In particular, the direction of the range is determined from neighboring primitive indices. That is, the "direction" of the range is determined by looking at the neighboring keys $k_{i-1}$, $k_i$, $k_{i+1}$. The direction is denoted by d, so that d=+1 indicates a range beginning at i, and d=−1 indicates a range ending at i. Since every internal node covers at least two keys, it is determined as a property of the tree structure of FIG. 5 that $k_i$ and $k_{i+d}$ must belong to $I_{i-d}$. In addition, it is determined as a property of the tree structure of FIG. 5 that $k_{i-d}$ belongs to a sibling node $I_{i-d}$, since siblings are always located next to each other.

More specifically, the direction of a range is determined based on which neighboring primitive has the most index matches. For example, in FIG. 4, the range for the internal node index or "3" 440 begins or ends with primitive index or leaf node "3" 450. The direction is determined by comparing the neighboring indexes or leaf nodes, such as, primitive index "2" 470 and primitive index "4" 480, with the primitive index having the same index as the internal node (e.g., primitive index "3" 450). As such, primitive index "2" 470 has a Morton code sequence of "0-0-1-0-0", primitive index "3" 450 has a Morton code sequence of "0-0-1-0-1", and primitive index "4" has a Morton code sequence of "1-0-0-1-1." The primitive index with the most matches to primitive index "3" 450 is primitive index "2" 470. As such, the direction of the range 445 goes to the left to include primitive index "2" 470, such that the range 445 includes primitive indices "0-3".

For example, the direction is determined in lines 2-3 of pseudocode 600. That is, the keys belonging to $I_i$ share a common prefix that must be different from the one in the sibling by definition. This implies that a lower bound for the length of the prefix is given by $\delta_{min}=\delta(i, i-d)$, so that $\delta(i, j)>\delta_{min}$ for any $k_j$ belonging to $I_i$. This condition is satisfied by comparing $\delta(i, i-1)$ with $\delta(i, i+1)$, and choosing $\delta$ so that $\delta(i, i+d)$ corresponds to the larger one, as is shown in line 3 of pseudocode 600.

At 520, the method includes determining a length of the corresponding range. More particularly, a maximum value or upper bound is determined for the length in embodiments. In addition, the actual value for the length is determined by performing a binary search, in embodiments. Specifically, the other end of the range is determined by searching for the largest l that satisfies $\delta(i, i+ld)>\delta_{min}$, as provided in pseudocode 600. In one embodiment, a power-of-two upper bound $l_{max}>l$ for the length is determined by starting from value "2" and increasing the value exponentially until it no longer satisfies the inequality, as is shown in lines 6-8 of pseudocode 600. Once the upper bound is determined, the length "l" is determined using binary search in the range $[0; l_{max}-1]$. The idea is to consider each bit of l in turn, starting from the highest one, and set it to one unless the new value would fail to satisfy the inequality, as is shown in lines 10-13 of pseudocode 600. The other end of the range is then given by j=i+ld.

At 530, the method includes determining a highest differing bit between primitive indices in the corresponding range, for purposes of determining the child indices for the given index corresponding to the internal node. For example, in pseudocode 600, $\delta(i,j)$ denotes the length of the prefix corresponding to $l_i$, which is labeled by $\delta_{node}$. This is used to find the split position γ by performing a similar binary search for largest $s \in [0; l-1]$ satisfying $\delta(i, i+sd)>\delta_{node}$, as is shown in lines 17-20 of pseudocode 600. If d=+1, γ is then given by i+sd, as this is the highest index belonging to the left child. If d=−1, the value is decremented by value one to account for the inverted indexing.

For example, the split position is for internal node "43" 440 in FIG. 4. As shown, the highest differing bit between primitive indices "0-3" of range 445 is between primitive indices "1" 460 and "2" 470. That is, primitive index "1" 460 has a Morton code sequence of "0-0-0-1-0" and primitive index "2" 470 has a Morton code sequence of "0-0-1-0-0". The highest differing bit occurs at the third bit shown by line 490.

Also, at 540, the method includes assigning child node indices for the given node index corresponding of the primitive indices associated with the highest differing bit determined above. For example, in pseudocode 600 of FIG. 6, given i, j, and γ, the children of $I_i$ cover the ranges [min(i, j); γ] and [γ+1; max(i; j)]. For each child, the beginning and end of its range is compared to see whether it is a leaf, and then reference the corresponding node at index γ or γ+1 in accordance with the node layout (e.g., FIG. 4), as shown in lines 23-24 of pseudocode 600 of FIG. 6.

In one embodiment, the algorithm presented in pseudocode 600 of FIG. 6 is implemented on a GPU as a single kernel launch, where each thread is responsible for one internal node. Assuming that the length of the keys is fixed, $\delta(i, j)$ can be evaluated efficiently by computing logical XOR between the two keys and counting the leading zero bits in the resulting integer.

The binary radix tree constructed in FIGS. 1-6 is used to construct secondary trees, in embodiments of the invention. In one embodiment, a BVH is constructed from the binary radix tree, in accordance with one embodiment of the present disclosure. Specifically, a BVH for a set of 3D primitives is constructed as follows: (1) assign a Morton code for each primitive according to its centroid, (2) sort the Morton codes, (3) construct a binary radix tree, and (4) assign a bounding box for each internal node.

If the Morton codes of all primitives are unique, it is noted that the binary radix tree is identical in structure to the corresponding linear BVH—identifying the common prefixes between the Morton codes is equivalent to bucketing the primitives recursively according to each bit. The case of duplicate Morton codes is handled explicitly, since the construction algorithm of FIG. 6 relies on the keys being unique. This is accomplished in one embodiment by augmenting each key with a bit representation of its index, i.e., k0 i=ki_i, where_indicates string concatenation. In practice, there is no need to actually store the augmented keys, because it is enough to simply use i and j as a fallback if ki=k j when evaluating δ(i; j).

Previous methods for linear BVHs calculate the bounding boxes sequentially in a bottom-up fashion, relying on the fact that the set of nodes located on each level is known a priori. In one embodiment, a different approach is presented where the paths from leaf nodes to the root are processed in parallel. Each thread starts from one leaf node and walks up the tree using parent pointers that we record during radix tree construction. Threads are tracked to determine how many threads have visited each internal node using atomic counters, such that the first thread terminates immediately while the second one gets to process the node. This way, each node is processed by exactly one thread, which leads to O(n) time complexity. The number of global atomics can be reduced by using faster shared memory atomics whenever it is detected that all the leaves covered by a given internal node are being processed by the same thread block.

The binary radix tree constructed in FIGS. 1-6 is used to construct secondary trees, such as, octrees. To construct an octree for a set of points, each 3k-bit prefix of a given Morton code maps directly to an octree node at level k. These prefixes are enumerated by looking at the edges of a corresponding binary radix tree, such that an edge connecting a parent with a prefix of length $\delta_{parent}$ to a child with a prefix of length $\delta_{child}$ represents all subprefixes of length $\delta_{parent}+1, \ldots, \delta_{child}$. Out of these, $\lfloor \delta_{child}/3 \rfloor - \lfloor \delta_{parent}/3 \rfloor$ are divisible by 3. These counts are evaluated during radix tree construction, and then a parallel prefix sum is performed to allocate the octree nodes. The parents of the octree nodes are found by looking at the immediate ancestors of each radix tree node.

The processing thus consists of seven steps: (1) calculate Morton codes for the points, (2) sort the Morton codes, (3) identify duplicates, i.e., points falling within the same leaf node, by comparing each pair of adjacent Morton codes, (4) remove the duplicates using parallel compaction, (5) construct a binary radix tree, (6) perform parallel prefix sum to allocate the octree nodes, and (7) find the parent of each node.

The binary radix tree constructed in FIGS. 1-6 is used to construct secondary trees, such as, k-d trees, in accordance with one embodiment of the present disclosure. The radix tree produced by step 5 above can be interpreted directly as a k-d tree over the points, in one embodiment. Every internal node partitions the points according to the next bit in the Morton codes after their common prefix, which is equivalent to classifying them on either side of an axis-aligned plane in 3D. A prefix of length δ corresponds to a plane perpendicular to the dth main axis, where d=δ mod 3. The position of the plane is given by $0.B_d B_{d+3} \ldots B_{\delta-3} 1$, where $B_i$ represents the ith bit of the prefix.

Thus, according to embodiments of the present disclosure, systems and methods are described that provide maximizing parallelism in the construction of secondary hierarchical trees (e.g., BVHs, octrees, and k-d trees) through the parallel construction of binary radix trees.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the present disclosure are thus described. While the present disclosure has been described in particular embodiments, it should be appreciated that the disclosure should not be construed as limited by such embodiments, but rather construed according to the below claims.

The invention claimed is:

1. A non-transitory computer-readable storage medium having computer-executable instructions for causing a computer system to perform a method comprising:

determining a plurality of primitives comprising a total number of primitive nodes that are indexed, wherein said plurality of primitives correspond to leaf nodes of a binary radix tree;

sorting said plurality of primitives; and building said binary radix tree comprising said primitive nodes and one or more internal nodes, said binary radix tree requiring at most a linear amount of temporary storage with respect to said total number of primitive nodes, wherein said building said binary radix tree comprising determining a highest differing bit between a corresponding range of primitive indices of said plurality of primitives; and building an internal node of said one or more internal nodes of said binary radix tree in parallel with one or more of its ancestor nodes, wherein said building a binary radix tree comprises performing, for a given node index corresponding to an internal node, a binary search to determine a length of said corresponding range of primitive indices based on said node index.

2. The computer-readable storage medium of claim 1, wherein said determining a plurality of primitives in said method comprises:

assigning a Morton code to each primitive.

3. The computer-readable storage medium of claim 1, wherein said building a binary radix tree in said method comprises:

building a binary radix tree comprising said primitive nodes and one or more internal nodes, such that each internal node corresponds to a longest common prefix shared by primitives of corresponding primitive nodes in a respective subtree.

4. The computer-readable storage medium of claim 1, wherein said building a binary radix tree in said method comprises:

processing an arbitrary subset of internal nodes in parallel.

5. The computer-readable storage medium of claim 1, wherein said building a binary radix tree in said method further comprises performing at least one of:

determining a direction of said corresponding range of primitive indices of said plurality of primitives based on said node index comprising a beginning primitive index or an ending primitive index in said corresponding range; and assigning child node indices for said given node index corresponding to said primitive indices associated with said highest differing bit.

6. The computer-readable storage medium of claim 5, wherein said determining a direction in said method further comprises:

determining said direction based on which neighboring primitive has the most index matches.

7. The computer-readable storage medium of claim 5, wherein said performing a binary search to determine said length comprises:

determining a maximum value for said length.

8. The computer-readable storage medium of claim 5, wherein one of said child node indices comprises a leaf node.

9. The computer-readable storage medium of claim 5, wherein said method further comprises:

numbering indices for said plurality of primitives;

numbering indices for said at least one internal node with the same numbering scheme used for said plurality of primitives, wherein a total number of said at least one internal node comprises said total number of primitives less one, and wherein a range of primitives indices for an index number for an internal node includes the same index number in said plurality of primitives.

10. A computer system comprising:

a processor; and memory coupled to said processor and having stored therein instructions that, if executed by said computer system, cause said computer system to execute a method comprising:

determining a plurality of primitives comprising a total number of primitive nodes that are indexed, wherein said plurality of primitives correspond to leaf nodes of a binary radix tree;

sorting said plurality of primitives; and building said binary radix tree requiring at most a linear amount of temporary storage with respect to said total number of primitive nodes, said building said binary radix tree comprising determining a highest differing bit between a corresponding range of primitive indices of said plurality of primitives; and building an internal node of said binary radix tree in parallel with one or more of its ancestor nodes, wherein said building a binary radix tree in said method comprises performing, for a given node index corresponding to an internal node, a binary search to determine a length of said corresponding range of primitive indices of said plurality of primitives based on said node index.

11. The computer system of claim 10, wherein said determining a plurality of primitives in said method comprises:

assigning a Morton code to each primitive.

12. The computer system of claim 10, wherein said building said binary radix tree in said method comprises:

building a binary radix tree comprising said primitive nodes and one or more internal nodes, such that each internal node corresponds to a longest common prefix shared by primitives in a respective subtree.

13. The computer system of claim 12, wherein said method further comprises:

building a second tree based on said radix tree.

14. The computer system of claim 12, wherein said building a binary radix tree in said method comprises:

processing an arbitrary subset of internal nodes in parallel.

15. The computer system of claim 12, wherein said building a binary radix tree in said method comprises:

determining a direction of said corresponding range of primitive indices of said plurality of primitives based on said node index comprising a beginning primitive index or an ending primitive index in said corresponding range; and assigning child node indices for said given node index corresponding to said primitive indices associated with said highest differing bit.

16. The computer system of claim 15, wherein said determining a direction in said method further comprises performing at least one of:

determining said direction based on neighboring primitives.

17. The computer system of claim 15, wherein said performing a binary search to determine a length comprises:

determining a maximum value for said length.

18. A system comprising:

means for assigning a Morton code to a plurality of primitives comprising a total number of primitive nodes that are indexed, wherein said plurality of primitives correspond to leaf nodes of a hierarchical tree;

means for sorting said plurality of primitives; and means for building said binary radix tree requiring at most a linear amount of temporary storage with respect to said total number of primitive nodes, said building said binary radix tree comprising determining a highest differing bit between a corresponding range of primitive indices of said plurality of primitives; and means for building an internal node of said binary radix tree in parallel with one or more of its ancestor nodes, wherein said means for building a binary radix tree comprises means for performing, for a given node index corresponding to an internal node, a binary search to determine a length of said corresponding range of primitive indices of said plurality of primitives based on said node index.

19. The system of claim 18, wherein said means for building said binary radix tree comprises:

means for building a binary radix tree comprising said primitive nodes and one or more internal nodes that processes said one or more internal nodes in parallel, such that each internal node corresponds to a longest common prefix shared by primitives in a respective subtree.

20. The system of claim 18, wherein said means for building a binary radix tree comprises at least one of:

means for determining a direction of said corresponding range of primitive indices of said plurality of primitives based on said node index comprising a beginning primitive index or an ending primitive index in said corresponding range; and means for assigning child node indices for said given node index corresponding to said primitive indices associated with said highest differing bit.

* * * * *